Patented Aug. 27, 1935

2,012,300

UNITED STATES PATENT OFFICE 2,012,300

METHOD OF PURIFYING HORMONE PREPARATIONS

Adolf Butenandt, Gottingen, Germany, assignor to Schering-Kahlbaum A. G., Berlin, Germany No Drawing. Application September 21, 1933, Serial No. 690,422. In Germany September 27, 1932

2 Claims. (Cl. 260—131)

My invention relates to the class of substances known as germinal gland hormones, which includes the follicle hormones, and has for one of its objects to provide means for producing combinations of said follicle hormones with other chemical compounds, these combinations being readily split up into its constituents, thereby enabling the hormone constituent to be obtained in pure state.

I have found that the follicle hormones can easily be made to combine with quinoline, compounds insoluble in water being obtained which form fine crystals. These compounds can be made use of with particular advantages for the purification of the follicle hormones, since on being acted upon with a dilute acid such as hydrochloric acid or sulphuric acid they will be split up again under the formation of the unchanged hormones. I have found this method to be particularly suitable in the separation of the follicle hormones from partly purified, however not altogether pure hormone preparations.

In practising my invention I may for instance proceed as follows:—

Example 1 part of the crude follicle hormone $C_{18}H_{22}O_2$ is mixed with an equal quantity, by weight, of quinoline and the mixture cautiously heated so as to obtain complete solution. When this solution cools down, it solidifies as a whole, forming a crystal broth which is freed from liquid by pressing it onto a piece of unglazed pottery. The molecular addition compound thus obtained corresponds to the formula $C_{18}H_{22}O_2.C_9H_7N$, its melting point is 210° C. It can be recrystallized from its solution in ether and from pure alcohol. By acting with dilute acids on the addition compound itself or on solutions of it in organic solvents, for instance alcohol, the addition compound is readily decomposed into its components.

Various changes may be made in the details disclosed in the foregoing specification without departing from the invention or sacrificing the advantages thereof.

I claim:—

1. The method of purifying follicle hormone preparations comprising acting thereon with the molecular quantity of quinoline to produce an addition compound, and acting on this compound with water to decompose same and to recover the hormone constituent in pure state.

2. The method of purifying follicle hormone preparations comprising acting thereon with the molecular quantity of quinoline to produce an addition compound, and acting on this compound with acidulated water to decompose same and to recover the hormone constituent in pure state.

ADOLF BUTENANDT.